Figures 3, 4:
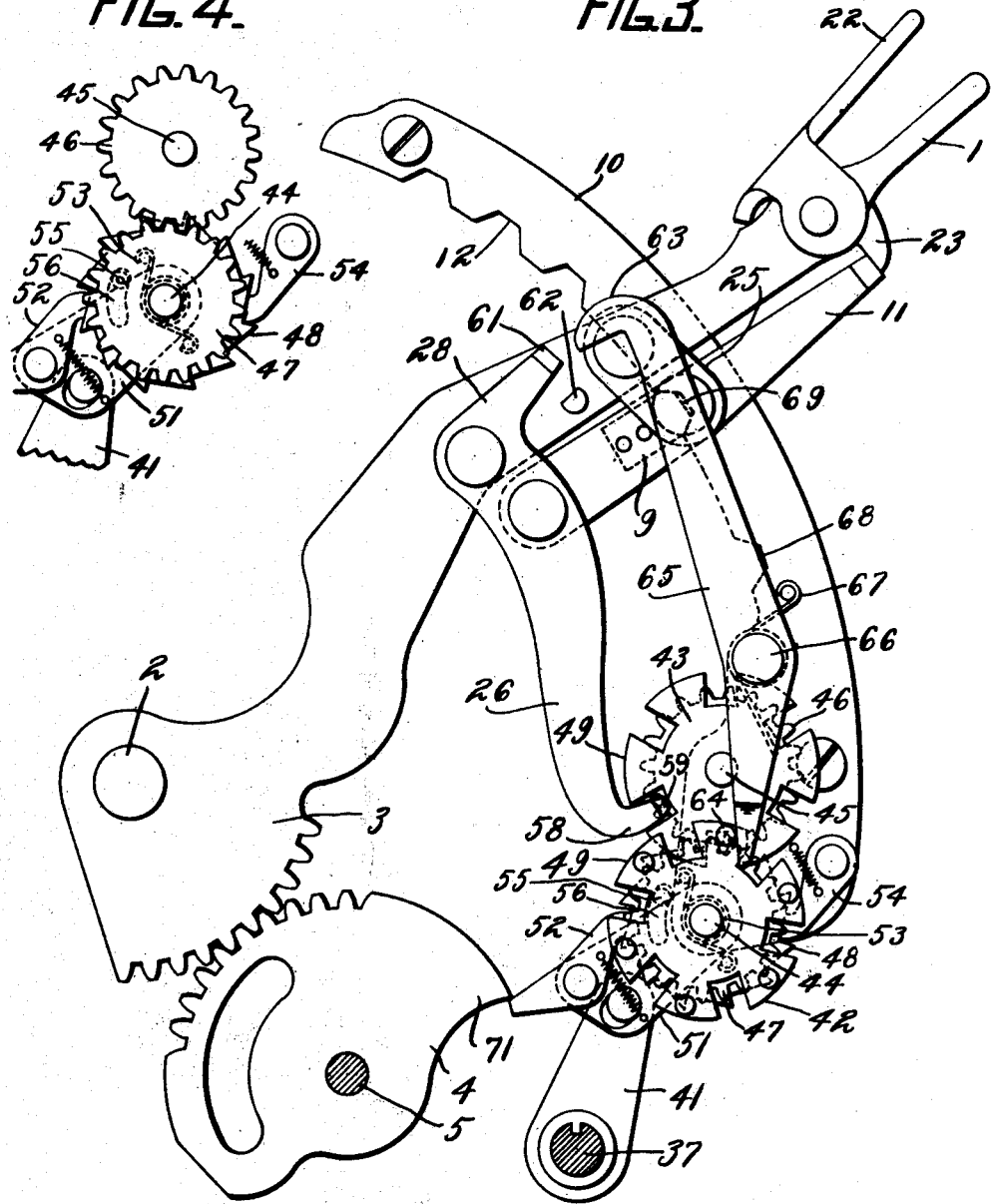

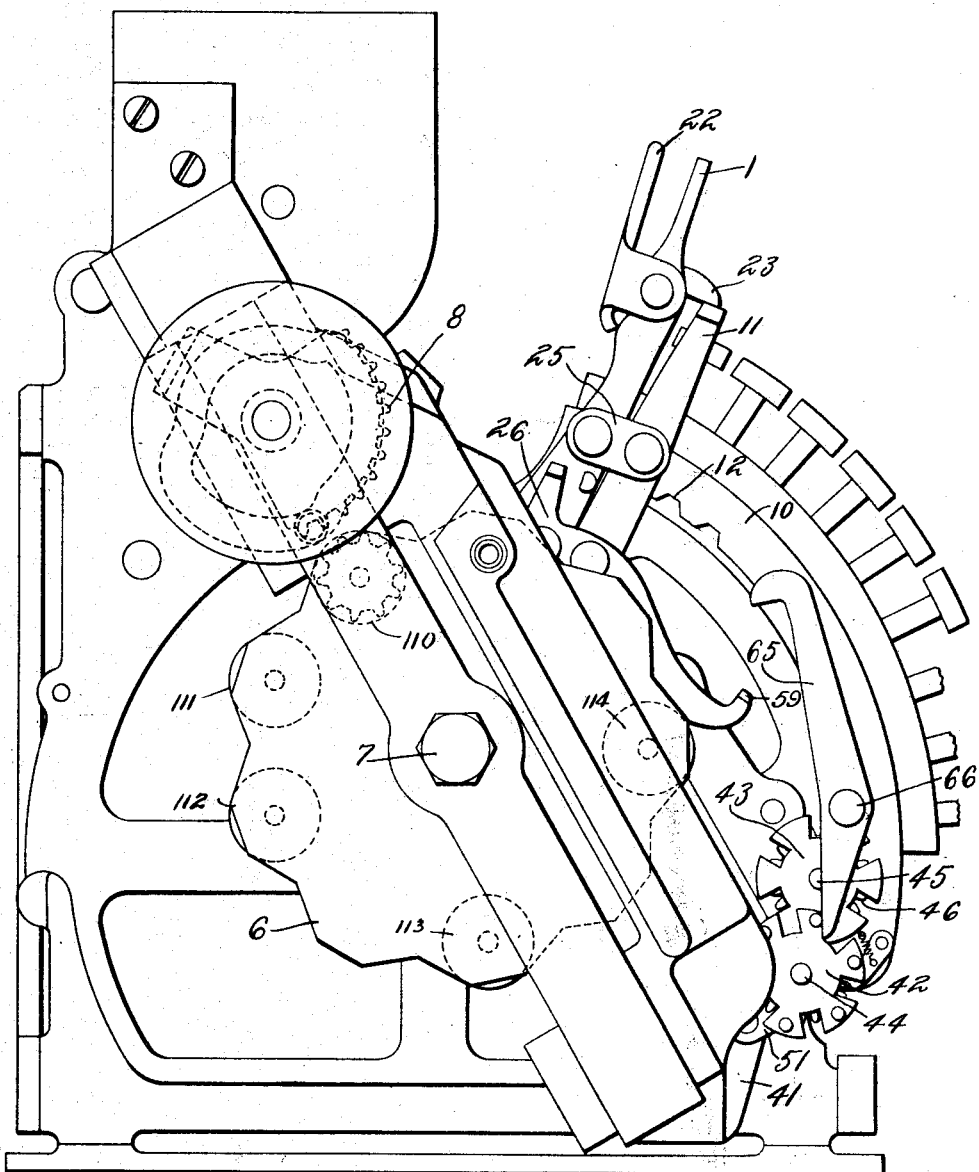

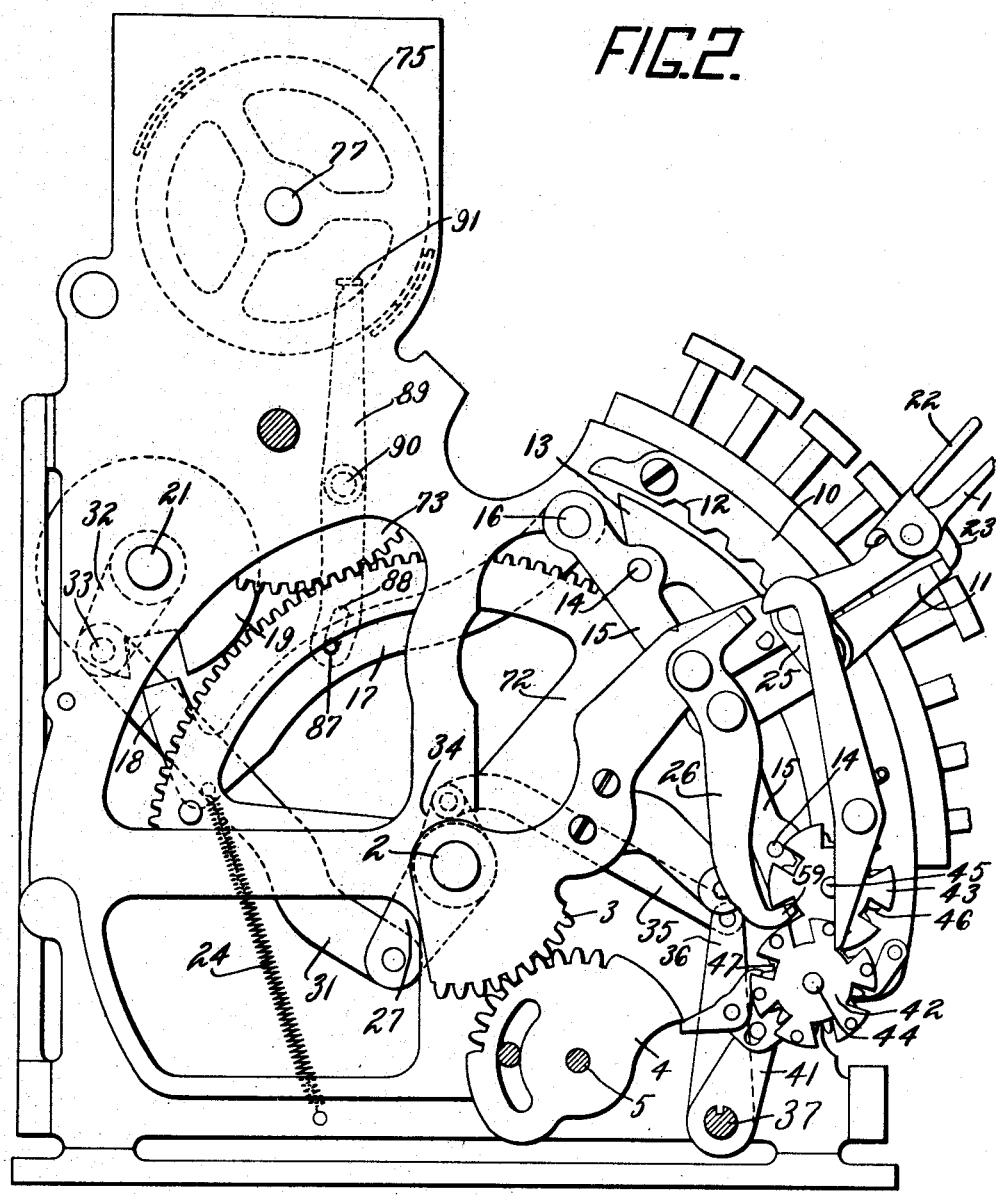

E. J. VON PEIN.
MULTIPLE CASH REGISTER.
APPLICATION FILED MAY 22, 1913.

1,206,952.

Patented Dec. 5, 1916.
4 SHEETS—SHEET 3.

Witnesses
H. F. Jadysbury
E. D. Lion

Inventor
Edward J. Von Pein
by R. Claar
Chester H. Branelton
Attorneys

E. J. VON PEIN.
MULTIPLE CASH REGISTER.
APPLICATION FILED MAY 22, 1913.
1,206,952.
Patented Dec. 5, 1916.
4 SHEETS—SHEET 4.
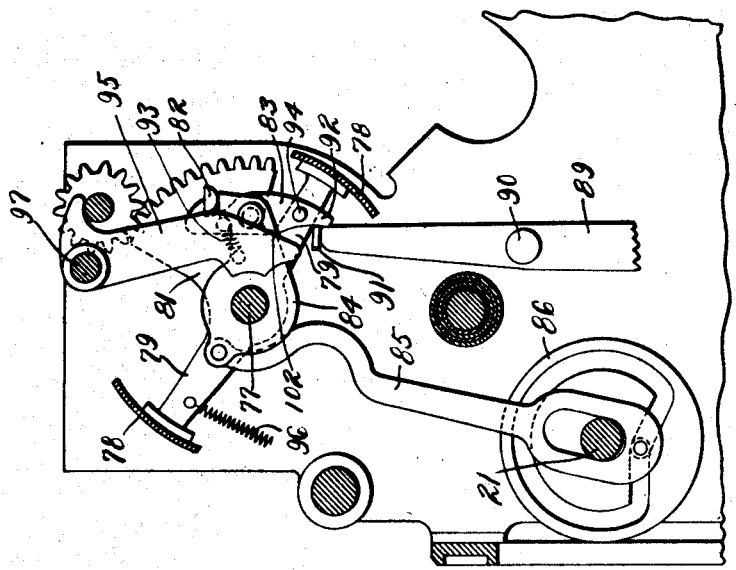
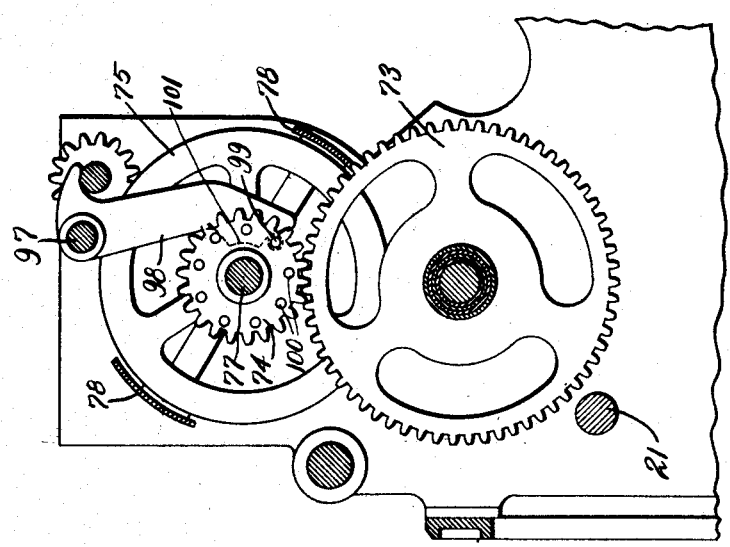
Witnesses
H. F. Sadgebury
Inventor
Edward J. Von Pein
Attorneys

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, INCORPORATED IN 1906.

MULTIPLE CASH-REGISTER.

1,206,952.  Specification of Letters Patent.  Patented Dec. 5, 1916.

Application filed May 22, 1913. Serial No. 769,126.

*To all whom it may concern:*

Be it known that I, EDWARD J. VON PEIN, a citizen of the United States, residing at Dayton, in the county of Montgomery and State of Ohio, have invented certain new and useful Improvements in Multiple Cash-Registers, of which I declare the following to be a full, clear, and exact description.

This invention relates to cash registers or accounting machines of the type having a plurality of totalizers, one of which may be used to record the cost prices and another the selling prices of articles sold.

In the drawings and description given below the improvement is disclosed in a cash register of the type described in United States Letters Patent 703,639, granted July 1, 1902, to Thomas Carroll and containing improvements covered by United States Letters Patent 938,527, and United States Letters Patent 1,008,397, granted November 22, 1909, and November 14, 1911, respectively to E. J. Von Pein, and improvements covered by application of E. J. Von Pein Serial No. 415,959, filed February 14, 1908. This machine is used for illustrative purposes only, however, as the invention is one that can be embodied in various forms in other types of cash registers and accounting machines and it is not the intention to confine its application to any one type. It is also to be understood that while in this specification the improvement is described in connection with the entry of cost and selling prices only, it is not the intention to limit its use to cost and selling price machines. A machine containing the improvement can be used equally as well in segregating and recording other correlated transactions when it is desirable to inforce the entry of both of the related items.

One object of this invention is to compel the operator of a machine containing the improvement to register the cost price of the article sold before the selling price can be registered.

Another object is to compel the operator, after the cost price has been registered, to register the selling price of the article sold before the machine can be operated for any other purpose.

Still another object is to provide in a machine whose indicators are exposed on certain operations and concealed on others, means whereby an operation on which the indicators are concealed will automatically compel the registration on the next succeeding operation of a certain kind of transaction for which the indicators will be exposed.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1 shows a left side elevation of a cash register of the type mentioned above with the improvements assembled in position. Fig. 2 is the same view of the machine with the multiple totalizers removed. Fig. 3 is a detail showing the parts of the improvements in their operative relations. Fig. 4 is a detail showing parts of the device. Figs. 5 and 6 are details in side elevation and partly in section of the flash operating mechanism.

Cash registers of the type used for illustration are now on the market and widely used for registering the cost and selling prices of articles; but there is nothing to prevent the operator simply recording the selling price and failing to record the cost price of the article or vice versa. The purpose of using these two totalizers is, of course, to enable the proprietor to tell at any time not only the total of his gross sales, but by comparing the gross sales as shown by the selling price totalizer with the total shown on the cost totalizer, determine his gross profits for a day or any other period of time. It is absolutely necessary that all registrations of both classes be made if this system is to be accurate enough to be of any value whatever to the merchant. This invention accomplishes this result by making it impossible to register the selling price unless the cost price has been recorded. More than this, after the cost price has been recorded the machine cannot be operated for any other purpose until the selling price has been entered. This positively insures the entry of both transactions on such sales and information obtained by comparing the amounts shown on the two totalizers is reliable.

A machine of the type used for illustrating the improvement has a plurality of totalizers carried in a revolving reel or drum. A lever is provided for rotating this reel so as to bring any desired totalizer into operative relation with the actuators or to any other common position. Attached to this lever and working in connection with it is an alining mechanism controlled by a thumb lever attached to the main lever, which makes it impossible to operate the machine until the totalizer reel is positioned with one of the totalizers in exact operative relation with the actuators and the thumb lever released. The invention avails itself of this construction to accomplish the results wanted. Such a machine also has rotary indicators to indicate the amount and kind of each transaction entered. Screens are provided which conceal these indicators until they have been fully set up to show the transaction registered, after which the screens are drawn out of the way and the indicators exposed. The indicators are always set up when amount keys are used, regardless of which totalizer the amount is entered in. However, on cost transactions the screens are not drawn out of concealing position. This prevents the purchaser of an article from seeing the cost price shown by the indicators. After a registration is made with the indicators concealed, the device covered by this improvement compels the entry of the next succeeding transaction in a certain totalizer for which the indication will be exposed. As shown in Fig. 1, the machine has five totalizers mounted in a rotatable reel 6. The totalizers 110, 111 and 112 are designed to receive entries pertaining to certain classes of transactions, such as paid out, received on account and special, the fourth indicated by the numeral 113 is to receive entries of cost prices, while the fifth totalizer 114 is for selling prices.

The lever for positioning the totalizers is designated by the numeral 1 (Figs. 1 and 2). This lever is pivoted on a shaft 2 and integral with it is a segment 3 which meshes with a segment 4 fastened to a shaft 5. The shaft 5 also carries a segment (not shown) which meshes with a pinion attached to and concentric with the reel 6, and when the lever 1 is moved up or down the reel is rotated on its axis 7. In this way any desired totalizer in the reel may be brought into operative relation with actuators 8. The lever 1 is locked in adjusted position and the totalizers are alined with reference to the actuators by a block 9 (Fig. 3) engaging one of the notches 12, 68 or 69 in a plate 10 suitably curved for the purpose and attached to the frame of the machine. The lower end of this block rides upon the upper edge of a curved plate 13 loosely attached by the rivets 14 to the arms 15. The upper arm 15 is fastened to a shaft 16 and attached to the same shaft is a long lever 17 normally held in the position shown (Fig. 2) by a spring 24. The block 9 is attached to the side of a plunger 11. This plunger is swung by a link 25 and an arm 26 from the lever 1. A thumb grip 22 has an arm 23 resting against the top of the plunger 11 and when the thumb grip is pressed toward the bar 1, through the parts just mentioned the lever 17 is thrown up so that the nose 18 will engage a cut in a cam 19 fastened to the main drive shaft 21. At the same time the block 9 is drawn out of the notch 12 in which it has been resting and the lever 1 can be moved either up or down. It will be readily seen that as long as the block 9 is out of one of the alining notches the nose 18 of the lever 17 will prevent the machine from being operated.

The shaft 2 is rocked from the main drive shaft 1 by a pitman 31 connecting cranks 32 and 27 on the shafts 21 and 2 respectively. The shaft 21 makes a complete rotation each time the machine is operated and as the crank 32 is shorter than the crank 27, the rotation of the shaft 21 will only rock the shaft 2. The shaft 2 also has attached to it an arm 34 and a pitman 35 connects this arm 34 to an arm 36 fastened to a shaft 37. Any rocking movement of the shaft 2 is therefore transmitted to the shaft 37 rocking it in the same direction as shaft 2, but, on account of the difference in the lengths of the arms 34 and 36, the shaft 37 is rocked through a smaller arc than is the case with the shaft 2.

The mechanism described so far is the usual mechanism in a cash register of this type and any further information desired can be secured from the patents and application above mentioned. The description has gone into detail only because the improvement is operated by the parts mentioned of the mechanism.

The improvement comprises two notched disks 42 and 43 rotating on stub shafts 44 and 45 fastened in the machine frames. Attached to the disks are gears 46 and 47 (Figs. 3 and 4). These gears are always in mesh and the disks are rotated through them in fixed relations one to the other. Rotating loosely on the shaft 44 is a ratchet 48. A torsion spring 53 is coiled around the shaft 44 between the ratchet 48 and the gear 47 and has one end fastened to the ratchet and the other to the gear. Splined to the small rock shaft 37 above described is an arm 41 with a pin in the upper end engaging a slot in an arm 51, which is free on the shaft 44. This arm carries an operating pawl 52 and as the arm 41 is rocked during the operation of the machine this arm and pawl carry the ratchet 48 forward one division where it is retained by a retaining pawl 54. In Figs.

2 and 3 the register is shown tripped and ready to be operated with the lever 1 set at the cost position. An extension 58 on the lever 26 is resting in one of the notches of the disk 43 when a ratchet 48 is operated, as just described, thereby preventing the disks from rotating and the rotation of the ratchet tensions the torsion spring 53. The gear 47 has a pin 55 in its side which extends through a slot 56 in the ratchet 48 and when the ratchet has been operated, as just described, the pin 55 will be resting in the lower end of the slot. A register of this style has mechanism (not shown) which makes the machine inoperable until the thumb lever 22 has been pressed toward the bar 1 in the usual way. When the thumb lever is pinched for the next operation after a cost registration, the extension 58 is drawn out of the cut in the disk 43 and the tension of the spring 53 causes both of the disks to be rotated $\frac{1}{12}$ of a revolution or until stopped by the pin 55 in the gear 47 striking the upper end of the slot 56 in the ratchet 48. This brings one of the edges 49 of the disk 43 in the path of extension 58 and, as hereinbefore described, the nose 18 of the lever 17 is held up in the cut in the cam 19, making it impossible for the main drive shaft 21 to revolve, and the upper extension 28 of the lever 26 is held up against the stop pin 62 on the lever 1. At the same time one of a series of pins 64 in the disk 42 strikes the lower end of a bell crank lever 65 and swings it on its pivot 66 against the tension of a spring 67. A hook 63 on the upper end of the lever 65 will pass above a lug 61 on the lever 26 and hold the upper arm of the lever against a stop pin 62. This will prevent moving the lever 1 up to use any of the totalizers above the cost price position, but the rotation of the disks just mentioned has brought one of the notches of the disk 42 into such a position that the laterally extending lug 59 on the extension 58 of the lever 26 can enter it if the lever is set at the selling price position 68. Releasing the thumb grip 22 will then allow the spring 24 to disengage the lever 17 from the cam 19 and the machine can be operated to record the selling price. The operation of the ratchet on the selling price registration is just the same as previously described in connection with cost price registration and when the thumb grip 22 is pressed for the next operation following a selling price registration the disk 42 is released by the extension 58 on the lever 26 and the spring rotates it $\frac{1}{12}$ of a turn. This brings one of the edges 49 of the disk 42 in the path of the extension 58 on the lever 26 so that the next succeeding operation cannot be made on the selling price totalizer. On this rotation of the disk 42 the pin 64 passes from under the end of the bell crank lever 65 and the spring 67 swings the lever up so that the hook 63 is disengaged from the lug 61 on the lever 26. As this second $\frac{1}{12}$ rotation of the disks has brought one of the notches in the disk 42 in operative relation to the cost price position, it is now possible to move the lever 1 back to the cost price position or to any of the positions above the cost price position and operate the machine.

In a register of the type used to illustrate the invention two rotary indicators are provided, one to indicate at the front and the other at the back of the machine which of the totalizers is used in recording a transaction. These indicators are so connected that when the lever 1 rotates the totalizer reel the indicators are rotated in fixed relation to the reel, and when a totalizer is at the actuating position the characters representing that totalizer are always at the openings where the indicators are exposed. One of the pair of indicators is indicated by the dotted outline 75 (Fig. 2). The other indicator is not shown in the drawings, but it is rigidly connected by a sleeve to the indicator 75 and rotates on the same shaft 77. The mechanism connecting the lever 1 with the indicator comprises a segment gear 72 rigidly attached to the lever 1 and journaled on the shaft 2. The teeth of this segment gear are always in mesh with the teeth of an intermediate gear 73 (Figs. 2 and 5) and the intermediate gear is in turn always in mesh with a pinion 74 attached to the indicator 75. Clearly any movement of the lever 1 is positively transmitted to the indicator, and, as the totalizer reel is rotated by the same lever, the indicator and totalizer reel have, as indicated above, an invariable relation in their movements. The shaft 77 also carries a series of rotary indicators (not shown) to indicate the amount of each transaction. These amount indicators are set up by the registering mechanism in the usual way regardless of which of the reel totalizers the amount is entered in. Screens 78 are provided which extend laterally across the machine to conceal both the amount indicators and the totalizer indicators above described, until the full indication has been set up ready to be exhibited. The screens are then usually withdrawn and the indicators exposed. However, when the cost of an article is registered it is obviously important that the purchaser should be unable to see the cost price set up on the indicators. This result is best accomplished by allowing the screens 78 to remain in the concealing position when cost prices are registered, and to this end the illustrative machine has the mechanism shown in United States Letters Patent 1,008,397 mentioned above. This mechanism is shown in Figs. 5 and 6. In both figures the indicator screens are shown in their normal positions, in which positions they do not cover the indicator sight openings in the register cabinet. The screens are ordinarily left in this position at the completion of each operation of the machine. The screens 78 are carried by arms 79 loosely pivoted upon the indicator shaft 77. One of the arms 79 carries a segment gear 81 preferably made integral therewith and having a pin 82 which coacts with a hook shaped pawl 83 carried by a lever 84 for the purpose of connecting the segment gear 81 to the lever 84 which is also loosely pivoted upon the shaft 77 and connected by a pitman 85 to a cam 86 (Fig. 6) which is carried by main drive shaft 21. The cam 86 causes a reciprocation of the pitman 85 upon each operation of the machine. The pitman is first drawn downwardly causing the pawl 83 to be rocked upwardly. But before the drive shaft is rotated the lever 1 is first operated by pressing the thumb grip 22 toward the lever. This causes the arm 17 (Fig. 2) to be rocked upwardly as previously described. The arm 17 is provided with a pin 87 which extends through a slot 88 in a lever 89 which is pivoted to the frame of the machine on a pin 90 and at its upper end is provided with a lug 91 which extends at right angles to the lever across the tail 92 of the pawl 83. The pawl 83 is normally urged into engagement with the pin 82 by a spring 93 but when the grip 22 of the lever 1 is operated the arm 17 in rocking upwardly will cause the upper end of the lever 89 to rock forwardly so that the lug 91 of the lever engages the tail of the pawl 83 and rocks the pawl out of engagement with the pin 82. A spring 96 then quickly rocks the indicator screen carrying arms 79 into such position that the screens will cover the indicator sight openings of the cabinet. The pitman 85 is held in its lower position during the greater part of the rotation of the shaft 21, but as the shaft 21 nears its normal position the pitman is again raised by the cam 86 causing pawl 83 to return to its original position as indicated in Fig. 6. When the pawl 83 reaches its upper position it ordinarily rocks forwardly as it passes the pin 82 thus connecting segment 81 with the lever 84. Therefore upon the return of the pawl 83 to its original position the segment 81 will also be returned to its initial position causing the indicator screens to rock away from the sight openings and expose the indicators.

One of the objects of the invention covered by the Patent #1,008,397 mentioned was to cause the screens 78 to be held in the position in which they cover the indication whenever a cost registration is made and to this end means are provided for preventing the engagement of the pawl 83 with the pin 82 whenever the cost totalizer is in operative relation with the actuating mechanism. By rocking the pawl 83 rearwardly so that it will not engage the pin 82 upon the actuation of the pitman 85, the screens 78 will be left at the completion of the operation of the machine in the position to which they are drawn by the spring 96 for the purpose of rocking the pawl out of engaging position with the pin 82, the pawl is provided with a pin 94 for co-acting with an arm 95 which is carried by a short shaft 97. The shaft 97 also carries an arm 98 (Fig. 5) which is a duplication of the arm 95 but coacts with a pin 99 carried in any one of nine holes 100 in the pinion 74 of the indicator 75. It was previously stated that the indicator 75 serves the purpose of indicating which totalizer of the reel 6 is in operative relation with the actuating mechanism and as this depends upon the setting of the lever 1 it also indicates the position of the lever 1. There are five totalizers mounted upon the reel 6 and the hole 100 which is opposite the surface 101 of the arm 98 corresponds with the totalizer which is in an operative position. The pin 99 is inserted in the particular hole 100 which corresponds to the totalizer it is desired to use for receiving cost registrations. When the cost totalizer is in operative relation with the actuating mechanism the pin 99 is in engagement with the arm 98 thus holding the arm 98 forward. The angular position of the arm 95 on the shaft 97 coincides with the positions of the arm 98; therefore when the arm 98 is thrown forward the arm 95 will also be held forward. When in this position it is in the path of movement of the pin 94 in the pawl 83 and when the pawl is carried upward the pin 94 engages the surface 102 of the arm 95 causing the hook of the pawl 83 to be held out of engagement with the pin 82 in the segment 81. The position of the screens 78 is not disturbed when the pitman 85 returns to its normal position and the screens remain in the position to which they were drawn by the spring 96 when they were tripped by the thumb lever 22, i. e., covering the indicator sight openings of the cabinet. This prevents the customer from seeing the cost price of the article sold, although the cost price is set up on the amount indicators in the same way as on other transactions.

It is, of course, necessary to have this improvement inoperative when the machine is operated with the lever 1 set at positions other than the cost and selling price positions as there is no reason why successive entries in any of the other of the totalizers should be prevented. For this reason the segment 4 has an extension 71 which engages the tail of the operating pawl 52 when the lever 1 is swung to any of the positions above the cost price position, holding the pawl 52 out of engagement with the teeth of the ratchet 47; but when the lever 1 is swung down either to the cost price position 69 or the selling price position 68 the segment 4 is rotated anti-clockwise and the extension 71 no longer engages the tail of the pawl 52. The operation of the machine will then drive the ratchet 48 as described.

In summarizing the operation of a machine containing the improvement a general statement in regard to the entry of a single sale in the illustrative machine will be made. This machine has two totalizers in which records pertaining to an ordinary sale are to be entered, the cost and selling price totalizers. The other totalizers are used for other classes of transactions such as paid out, received on account, and special. When an article is sold the clerk records on one totalizer the cost as shown by the cost ticket attached to the article, then records the selling price on another totalizer. The natural tendency would be to record the selling price first and, if there were no means to prevent, the making of the cost registration would probably be overlooked. Or the cost price might be recorded and the selling price registration overlooked. Either would be bad, as the information as to profits secured by comparing the two totalizers would be unreliable. This invention makes such oversights impossible. It is so designed that the cost price must be recorded first and the machine is then inoperable until the selling price is registered on the selling price totalizer. A selling price registration restores the machine to normal condition and a registration can then be made on any of the totalizers except the selling price totalizer. This selling price totalizer is locked against operation at all times except immediately following a cost price registration. Normally one of the notches of the disk 43 is in position to receive the extension 58 of the arm 26 when the lever 1 is set at the cost price position 69. When the cost price registration is made the ratchet 42 is operated by the driving mechanism connected to shaft 37 and retained by the retaining pawl 54. The extension 58 on the lever 26 rests in one of the notches of the disk 43 and prevents the disks and gears from rotating, so the rotation of the ratchet places the torsion spring 53 under a tension. Then when the thumb grip 22 is pressed to release the machine for the next operation, the disk 43 is released and revolves $\frac{1}{12}$ of a turn so that one of the edges 49 of the disk holds the lever 26 in the same position as when the thumb grip 22 was pressed to operate the machine. This holds the alining block 9 out of the notch 12 in the lining plate 10, and the nose 18 of the lever 17 is thrown into engagement with the cam 19, holding the main drive shaft 21 against rotation, and making it impossible to operate the machine again on the same position of the lever. At the same time a hook 63 on the lever 65 engages the lug 61 on the lever 26 and the lever 1 cannot be moved upwardly. However, when the disk 43 was released the disk 42 was rotated far enough to present one of its notches to receive the extension 58 of the lever 26 when the lever 1 is placed at the selling price position 68. Setting the lever at that position and releasing the thumb lever 22 allows the lever 17 to be disengaged from the cam 19 and the machine is free to operate. Operating the machine on the selling price position and then pinching the lever 22 for the succeeding operation restores all of the parts of the device to their normal positions and when the lever 1 is moved up to register on any of the positions above cost price the extension 71 on the segment 4 holds the operating pawl 52 out of engagement with the ratchet 47 so that the device is not operated until the lever is again at either the cost or the selling price position.

The device exercises the same control over the indicating mechanism that it does over the totalizer reel. When the cost of an article is registered the indicator screens remain in concealing position to prevent the purchaser from learning the cost price. The device then compels the rotation of the indicator showing the classes of transactions to the position to indicate the selling price. This prevents successive operations with the indicators concealed, also successive operations with the selling price indication exposed.

While the form of mechanism herein shown and described is admirably adapted to fulfil the objects primarily stated, it is to be understood that it is not intended to confine the invention to the one form of embodiment herein shown and described as it is susceptible of embodiment in various forms, all coming within the scope of the claims which follow.

What is claimed is:—

1. In a machine of the class described, the combination with a reel, of a plurality of totalizers carried thereby; a single set of actuators for said totalizers; manipulative means for rotating the reel to position any desired totalizer in operative relation to the actuators; and means, automatically rendered effective by the operation of a certain one of the totalizers, compelling the positioning of the totalizers in a certain predetermined sequence.

2. In a machine of the class described, the combination with a main operating mechanism and a plurality of totalizers, of a common set of actuators for said totalizers, manipulative means for selectively bringing the totalizers into operative relation with the actuators, and means normally permitting the actuation of all but one of the totalizers, this means being constructed to require an operation thereof before each operation of the normally inoperable totalizer to render the latter operable.

3. In a machine of the class described, the combination with a main operating mechanism and a plurality of totalizers, of a single set of actuators for said totalizers, manipulative means for selectively bringing the totalizers into operative relation with the actuators, and means rendered effective by the actuation of a certain one of the totalizers for locking the main operating mechanism against operation except when a certain other one of the totalizers has been positioned in operative relation to the actuators.

4. In a machine of the class described, the combination with means for retaining a segregated analysis of transactions, of manipulative means for determining under what classification transactions shall be entered, and means for compelling the entry of certain correlated items in the aforesaid retaining means in a predetermined sequence.

5. In a machine of the class described, the combination with a main operating mechanism, of a plurality of totalizers for segregating and registering different classes of transactions, a common set of actuators for said totalizers, manipulative means for selectively positioning the totalizers in operative relation to the actuators, and means compelling the segregation and entry of successive and correlated transactions in separate totalizers.

6. In a machine of the class described, the combination with a main operating mechanism and a plurality of totalizers, of a common set of actuators for said totalizers, manipulative means for selectively placing the totalizers in operative relation with said actuators, and devices operated by the main operating mechanism when a certain one of the totalizers is used to compel placing the totalizers in operative relation to the actuators in a certain predetermined sequence.

7. In a machine of the class described, the combination with a main operating mechanism and a plurality of totalizers; of a common set of actuators for said totalizers; manipulative means for selectively positioning the totalizers with reference to the actuators, said means being normally free to be moved in either direction; and devices actuated by the main operating mechanism when a certain one of the totalizers is used locking the manipulative positioning means against movement in one direction.

8. In a machine of the class described, the combination with a main operating mechanism and a plurality of totalizers; of a common set of actuators for said totalizers; manipulative means for selectively positioning the totalizers with reference to the actuators, said means being normally free to be moved in either direction; means, actuated by the main operating mechanism when a certain one of the totalizers is used, locking the manipulative positioning means against movement in one direction; and means for disabling said locking means, said means being rendered effective by using a certain other one of the totalizers.

9. In a machine of the class described, the combination with a main operating mechanism; of a plurality of totalizers; a common set of actuators for said totalizers; manipulative means for positioning said totalizers with reference to the actuators; and devices rotated by the main operating mechanism designed to compel the segregation of correlated transactions and their entry in a predetermined sequence.

10. In a machine of the class described, the combination with a main operating mechanism, of a plurality of totalizers, a common set of actuators for said totalizers, manipulative means for positioning said totalizers with reference to the actuators, devices rotated by the main operating mechanism designed to compel the segregation of correlated transactions and their entry in a predetermined sequence; and a combination of levers co-acting with the rotary devices and aforesaid manipulative positioning means to accomplish the desired result.

11. In a machine of the class described, the combination with a main operating mechanism, of a plurality of totalizers for retaining records of segregated entries, a common set of actuators therefor, means for selectively positioning the totalizers in operative relation to the actuators, two notched disks, gears rigid with the disks and causing the disks to move in fixed relation one to the other, a ratchet driven by the main operating mechanism, a torsion spring connecting the ratchet to one of the gears and transmitting movements of the ratchet to the gears and disks, and levers co-acting between said disks and the totalizer positioning means to compel the segregation and entry of correlated transactions in a certain predetermined sequence.

12. In a machine of the class described, the combination with a main operating mechanism and a plurality of totalizers, of a single set of actuators for said totalizers, means for selectively bringing the totalizers into operative relation with the actuators, and means rendered effective by the actuation of a certain one of the totalizers locking the main operating mechanism against operation until a certain other one of the totalizers has been actuated, the remaining totalizers not affecting either the locking means or the disabling means.

13. In a machine of the class described, the combination with a main operating mechanism; of a plurality of totalizers, one of which is used to register cost prices and another selling prices, a common set of actuators for said totalizers; means for selectively placing the totalizers in operative relation with the actuators; means compelling the actuation of the cost totalizer before the selling price totalizer can be actuated, and means whereby the register cannot be otherwise operated after a cost registration except by using the selling price totalizer.

14. In a machine of the class described, the combination with a main operating mechanism and a plurality of totalizers, of a single set of actuators for said totalizers, means for selectively bringing the totalizers into operative relation with the actuators; devices compelling the entry of certain correlated items in a predetermined sequence, and means effective when certain totalizers are in operative relation to the actuators disconnecting the governing means from the main operating mechanism.

15. In a machine of the class described, the combination with a main operating mechanism, of a plurality of totalizers, a common set of actuators therefor, manipulative means for selectively bringing the totalizers into operative relation with the actuators, and means controlled by the main operating mechanism for compelling the segregation and entry of certain correlated transactions in a predetermined sequence.

16. In a machine of the class described, the combination with a plurality of accounting devices for retaining segregated entries of transactions, of manipulative means for bringing any desired accounting device to a common position, and means for compelling entries of correlated transactions in the accounting devices in a certain predetermined sequence.

17. In a machine of the class described, the combination with a main operating mechanism, of a plurality of totalizers, a single set of actuators common to said totalizers, manipulative means for positioning any desired totalizer in operative relation to the actuators, and means compelling a segregation of successive and correlated transactions on separate totalizers.

18. In a machine of the class described, the combination with a reel, of a plurality of totalizers carried thereby, a single set of actuators for said totalizers, manipulative means for rotating the reel to bring any desired totalizer into operative relation with the actuators, and means to prevent bringing the totalizers into operative relation with the actuators except in a certain predetermined sequence.

19. In a machine of the class described, the combination with a rotary member carrying a plurality of devices, of a second member rotating in fixed relation to and having divisions corresponding to the arrangement of the devices in the first member, a single manipulative device for selectively turning the rotary members to the positions where their respective functions are performed, means normally enabling the second member to perform its function, means for disabling said enabling means when a certain division of the second member is at the functioning position, and means preventing said disabling means from being again enabled until a different division of the second member has performed its function.

20. In a machine of the class described, the combination with an accounting machine, of a plurality of totalizers, a single set of actuators common thereto, manipulative means for selectively bringing the totalizers into operative relation to the actuators, an indicator to indicate the totalizer actuated, a screen concealing said indicator, means normally withdrawing said screen, means for disabling the withdrawing means when a certain totalizer is actuated, and means compelling the actuation of a different totalizer before said disabling means will again be effective.

21. In a machine of the class described, the combination with an operating mechanism, of an indicating mechanism and concealing means therefor, the relation between said indicating mechanism and concealing means being such that during certain operations of the operating mechanism the indicating mechanism will be exposed and during other operations of the machine the indicating mechanism will be concealed, a differentially adjustable manipulative device controlling the concealing means, and means compelling the adjustment of said manipulative device to different positions in a certain predetermined order.

22. In a machine of the class described, the combination with an operating mechanism, of indicating mechanism arranged to be exposed at the end of certain operations of the operating mechanism and concealed at the end of other operations, of a differentially adjustable manipulative device for determining whether the indicating mechanism is to be exposed or concealed, and means compelling the adjustment of said manipulative device to different positions in a certain predetermined order.

23. In a machine of the class described, the combination with an operating mechanism, of an indicating mechanism arranged to be exposed at the end of certain operations of the operating mechanism and concealed at the end of other operations, a differentially adjustable manipulative device for determining whether the indicating mechanism is to be exposed or concealed, and means rendered effective by an operation of the operating mechanism in which the indicators are concealed compelling the adjustment of said manipulative device in such a manner that the indicating mechanism will be exposed upon the succeeding operation of the operating mechanism.

24. In a machine of the class described, the combination with an operating mechanism, of an indicating mechanism arranged to be exposed at the end of certain operations of the operating mechanism and concealed at the end of other operations, of a differentially adjustable manipulative device for determining whether the indicating mechanism is to be exposed or concealed, and means rendered effective by the operation of the operating mechanism with the indicators concealed compelling the adjustment of said manipulative device to a certain position where the indicators will be exposed before the operating mechanism can be again operated.

25. In a machine of the class described, the combination with a rotary indicator having a plurality of indicating positions, of manipulative means for rotating said indicator to any desired position, and means effective with reference to certain of said positions compelling the rotation of the indicator to such positions in a predetermined order.

26. In a machine of the class described, the combination with a totalizer operating mechanism, of a plurality of totalizers arranged to coöperate therewith, a series of indicators, devices for preventing exposure of the indicators when a certain one of said totalizers is operated, adjustable manipulative devices controlling said preventing devices, and means compelling the adjustment of the manipulative devices on each operation to alternately conceal and expose the indicators in recording certain successive and correlated transactions in the totalizers.

27. In a machine of the class described, the combination with an accounting mechanism, of a plurality of totalizers, a single set of actuators common to said totalizers, manipulative means for selectively bringing the totalizers into operative relation to the actuators, a rotatable indicator having a plurality of indicating positions, said indicator being rotatable by the totalizer selecting means, and means effective with reference to certain of its indicating positions for compelling the rotation of the indicator to such positions in a predetermined order.

28. In a machine of the class described, the combination with an accounting machine, of indicating mechanism, an adjustable manipulative device for selectively exposing or concealing the indicating mechanism, and means rendered effective by an operation of the accounting machine on which the indicating mechanism is concealed compelling the adjustment of the manipulative device to a certain position where the indicating mechanism will be exposed before the machine will be again operable.

29. In a machine of the class described, the combination with an accounting machine, of an indicating mechanism arranged to be concealed on certain operations and exposed on other operations, an adjustable manipulative device controlling the concealment or exposure of the indicating mechanism, and means compelling the adjustment of said manipulative device between operations in such a way as to prevent successive operations on which the indicating mechanism will be exposed or successive operations on which said mechanism will be concealed when entering correlated transactions in the accounting machine.

30. In a machine of the class described, the combination with a main operating mechanism and a plurality of totalizers, of a common set of actuators for said totalizers, manipulative means for selectively bringing the totalizers into operative relation with the actuators, and means normally permitting the actuation of all but one of the totalizers, and disabled upon operation of one of the normally operative totalizers.

31. In a machine of the class described, the combination with a plurality of totalizers comprising a cost totalizer and a selling price totalizer, of a set of actuators common to said totalizers, devices for establishing coöperative relation between the actuators and any desired totalizer, and means rendered effective by actuation of the cost totalizer compelling the actuation of the selling price totalizer on the next succeeding operation.

32. In a machine of the class described, the combination with a plurality of totalizers comprising special transaction totalizers, a cost totalizer and a selling price totalizer; of a set of actuators common to said totalizers, manipulative means for establishing coöperative relation between the actuators and any desired totalizer, and means rendered effective upon actuation of the cost totalizer preventing the actuation of a special transaction totalizer until after the selling price totalizer has been actuated.

33. In a machine of the class described, the combination with a plurality of totalizers, of a set of actuators, means for establishing coöperative relation between said actuators and any desired totalizer, and means effective with reference to two only of the totalizers whereby actuation of the two totalizers except in a predetermined sequence is prevented.

34. In a cash register, the combination with a plurality of totalizers, of actuating mechanism therefor, manipulating means for selecting said totalizers for actuation, and means for preventing successive actuations of any one of said totalizers.

35. In a cash register, the combination with a plurality of totalizers, of actuating mechanism therefor, manipulative means for selecting said totalizers for actuation, and means for preventing the actuation of said totalizers in other than a predetermined sequence.

36. In a cash register, the combination with a plurality of totalizers, of actuating mechanism therefor, manipulative means for selecting said totalizers for actuation, and means for preventing the successive actuations of certain of said totalizers while permitting the actuation of others at will.

37. In a cash register, the combination with a plurality of totalizers, of actuating mechanism therefor, manipulative means for selecting said totalizers for actuation, and means for preventing the actuation of certain of said totalizers in other than a predetermined sequence while permitting the action of others at will.

38. In a machine of the class described, the combination with a plurality of totalizers comprising a cost totalizer and a selling price totalizer, of a set of actuators common to said totalizers, devices for establishing coöperative relation between the actuators and any desired totalizer, means rendered effective by the actuation of the cost totalizer compelling the actuation of the selling price totalizer on the next operation, and devices for disabling said means as a preliminary to actuation of any of the other totalizers.

39. In a machine of the class described, the combination with a movable frame, of a plurality of totalizers carried thereby, a set of actuators common to the totalizers, means for operating the actuators, means for effecting relative movement between the frame and the actuators to establish operative relation between the actuators and any desired totalizer, an indicator, connections controlled by the aforesaid means for giving the indicator positions corresponding to the various positions of the totalizer carrying frame, means for exposing the indicator when in certain positions, means for disabling said exposing means when the indicator is in a certain other one of its positions, and means preventing successive operations of actuator operating mechanism with the indicator in the last mentioned position.

In testimony whereof I affix my signature in the presence of two witnesses.

EDWARD J. VON PEIN.

Witnesses:
R. C. GLASS,
CARL BEUST.